Dec. 29, 1970   HIROZO TAKAURA ET AL   3,551,281
LAMINATED SAFETY GLASS WITH POLYVINYL-ACETAL
INTERLAYER CONTAINING ORGANOTIN COMPOUND
Filed July 24, 1967
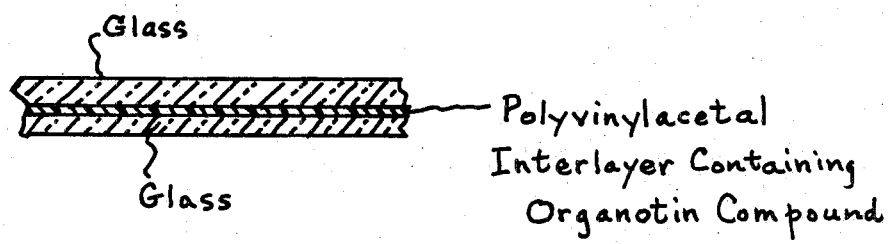
INVENTORS
Hirozō Takaura
Tosiharu Misake and
Sumio Ando
BY Wenderoth, Lind & Ponack
ATTORNEYS

3,551,281
LAMINATED SAFETY GLASS WITH POLYVINYL-ACETAL INTERLAYER CONTAINING ORGANO-TIN COMPOUND
Hirozō Takaura, Kouga-gun, Toshiharu Misaka, Ohtsu-shi, and Sumio Andō, Kurita-gun, Japan, assignors to Sekisui Kagaku Kogyo Kabushiki Kaisha, Osaka, Japan
Filed July 24, 1967, Ser. No. 655,584
Claims priority, application Japan, July 29, 1966, 41/49,947; Feb. 10, 1967, 42/8,683
Int. Cl. B32b 17/06
U.S. Cl. 161—199
14 Claims

ABSTRACT OF THE DISCLOSURE

In laminated safety-glass which comprises at least two sheets of glass adhered together with a plasticized polyvinylacetal interlayer, the improvement wherein said interlayer contains at least one organotin compound, said tin compound containing in its molecules a member selected from the group consisting of structural units of the formulas

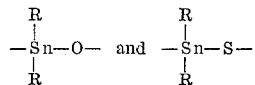

wherein R is a member selected from the group consisting of alkyl, aryl and aralkyl.

---

This invention relates to an improved laminated glass. More particularly, this invention relates to a laminated glass having higher resistance to penetration, which uses a plasticized polyvinylacetal composition as its interlayer.

Laminated glass has been used widely as safety-glass for automobiles as well as for other vehicles and also to some extent for architectural purposes.

The most commonly used laminated glass is one which consists of two sheets of glass adhered and reinforced by means of an interlayer of a plasticized polyvinylacetal composition. And this laminated glass has the property that, when broken, the plasticized interlayer prevents the breakage and scattering of the glass, thus preventing injury to the human body by menas of the fragments of glass.

At present, this laminated glass is used mainly as window glass for automobiles. The reason is that in the event of an automobile accident the greatest danger resides in injuries from broken fragments of glass and further lacerations resulting from the human body, especially the head and neck, plunging through the windshield due to the impact.

The dangers due to automobile accidents are on the increase as the speed of automobiles is becoming increasingly higher. Hence, the conventional laminated glass which has usually been adhered and reinforced with a 0.015-inch-thick plasticized polyvinylacetal interlayer is not fully satisfactory as to its safety and the demand is for laminated glass having still higher resistance to penetration. While this demand can be satisfied somewhat by using a thicker film of the plasticized polyvinylacetal composition as the interlayer of the laminated glass, much further research is being made with the aim of improving on the resistance to penetration of the laminated glass without increasing the thickness of the film. As a result, numerous proposals have been made.

As one of these proposals, known is that in which the moisture content of the plasticized polyvinylacetal composition is increased. While the resistance to penetration of laminated glass is enhanced by increasing the moisture content of the plasticized polyvinylacetal, there is however the drawback that bubbles are formed in the film or between the glass and the film, and that the resistance to ageing of the film is deteriorated, and hence satisfactory laminated glass cannot be obtained.

Also known is a method of enhancing the resistance to penetration of laminated glass by using as the interlayer a film made from a composition which is obtained by adding any of the various alkalis or alkaline substances to the plasticized polyvinylacetal composition. Again, there is known a method of increasing the resistance to penetration of laminated glass which uses as the interlayer a plasticized polyvinylacetal composition which is obtained by adjusting the moisture content of the plasticized polyvinylacetal to 0.1–0.8% by weight and then adding thereto an acetate of an alkali metal or an alkaline earth metal and a salt of a mono- or di-carboxylic acid having from 3 to 22 carbon atoms with an alkali metal or an alkaline earth metal.

It is however difficult according to these methods to accomplish the uniform addition to the polyvinylacetal composition of the alkalis or alkaline substance or, the acetate and other carboxylate of an alkali metal or alkaline earth metal. In addition, there is the drawback that, if the amount used is excessive, either the composition becomes turbid to impair the transparency thereof or the resistance to ageing of the composition is deteriorated to result in coloration of the composition.

The principal object of this invention is to provide laminated safety-glass having improved safety features.

A further object of this invention is to provide laminated safety-glass having improved resistance to penetration by impacting objects such as the human head.

A particular object of this invention is to provide improved physical properties in laminated safety-glass.

Another object of this invention is to provide method and means to accomplish the preceding objects.

The foregoing objects are achieved by a laminated safety-glass in which at least two sheets of glass are adhered together by means of an interlayer of a plasticized polyvinylacetal composition containing at least one type of organotin compound having in its molecules either the structure

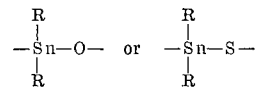

wherein R is alkyl, aryl or aralkyl.

The plasticized polyvinylacetal composition, as used in this invention, refers to a composition obtained by plasticizing the customarily obtained polyvinylacetal by adding to 100 parts by weight thereof a plasticizer in an amount of usually 20–80 parts by weight, and preferably 35–45 parts by weight. And as the polyvinylacetal resin, conveniently used is especially a polyvinylbutyral resin having 55–75 mol percent vinyl butyral, and 0–10 mol percent of vinyl acetate, and the remainder being vinyl alcohol. On the other hand, as the plasticizer, triethylene glycol-di-2 ethyl butyrate, triethylene glycol-di-2 ethyl hexoate and dibutyl sebacate are generally suitable.

Typical examples of the organotin compounds having in its molecules either the structure

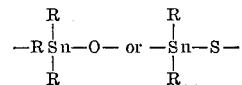

wherein R is alkyl, aryl or aralkyl, are shown below roughly classified. In the formulas given, R, $R_1$ and $R_2$ are an alkyl, aryl or aralkyl radical of 1–22 carbon atoms. $R'_1$ and $R'_2$ are alkylene radical of 1–22 carbon atoms and $n$ is a positive integer from 2 to 20.

(i) dialkyl tin dicarboxylate

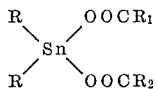

(ii) dialkyl tin maleate

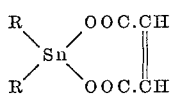

(iii) dialkyl tin monoalkoxy-monocarboxylate

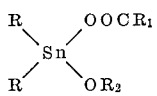

(iv) dialkyl tin di-monoalkyl maleate

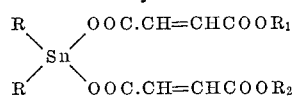

(v) dialkyl tin monocarboxy-monoalkyl maleate

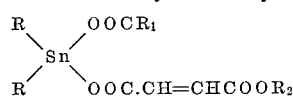

(vi) dialkyl tin monoalkoxy-monoalkyl maleate

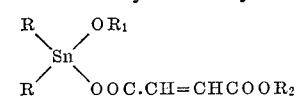

(vii) trialkyl (or aryl, aralkyl) tin monocarboxylate

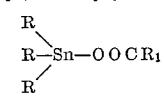

(viii) trialkyl (or aryl, aralkyl) tin monoalkoxide

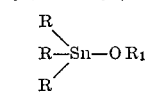

(ix) dialkyl tin mercapto acid ester

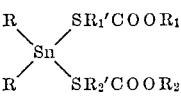

(x) dialkyl tin mercaptide

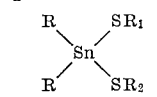

(xi) polymerized organotin dialkoxide

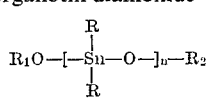

(xii) polymerized organotin monoalkoxy-monocarboxylate

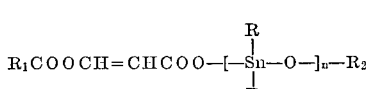

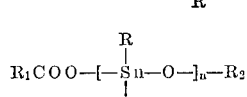

(xiii) dialkyl tin maleate polymer

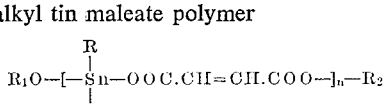

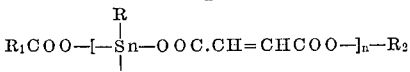

(xiv) dialkyl tin polysulfide

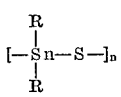

(xv) polymerized dialkyl tin dialkylene glycol dithioglycolate

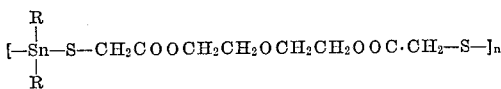

Specific examples of these organotin compounds are as follows. As examples of dialkyl tin dicarboxylate, included are such as dibutyl tin dilaurate, dioctyl tin distearate, and dibutyl tin distearate. As examples of dialkyl tin maleate, mention can be made of such as dibutyl tin maleate and dioctyl tin maleate. The dialkyl tin monoalkoxy-monocarboxylate is exemplified by such as dibutyl tin butoxy-stearate and dibutyl tin butoxy-laurate, while as examples of dialkyl tin di-monoalkyl maleate, included are dibutyl tin dimonodecyl maleate, dioctyl tin di-monooctyl maleate and dibutyl tin monodecyl-monolauryl maleate. Examples of dialkyl tin monocarboxy-monoalkyl maleate include such as dibutyl tin monolaurate-monooctyl maleate and dibutyl tin monostearate-monodecyl maleate. As dialkyl tin monoalkoxy-monoalkyl maleate can be mentioned such as dibutyl tin monobutoxy-monodecyl maleate, dibutyl tin monobutoxy-monooleyl maleate and dibutyl tin monoethoxy-monolauryl maleate. Trialkyl (or aryl, aralkyl) tin monocarboxylate is exemplified by such as tributyl tin laurate and tribenzyl tin laurate. Examples of trialkyl (or aryl, aralkyl) tin monalkoxide include such as tributyl tin butoxide and tributyl tin octoxide. The dialkyl tin mercapto acid esters are exemplified by such as dibutyl tin SS' bis (butyl mercaptolaurate) and dioctyl tin SS' bis (octyl mercaptocaprylate), while, as examples of dialkyl tin mercaptides, included are such as dibutyl tin didecyl mercaptide and dibutyl tin dioctyl mercaptide. The polymerized organotin dialkoxides include such, for example, as polymerized dibutyl tin dibutoxide, and the polymerized organotin monoalkoxy-monocarboxylates are exemplified by polymerized dibutyl tin monobutoxy-monooctyl maleate and polymerized dibutyl tin monobutoxy-monolaurate. As an example of dialkyl tin maleate polymers, included is such as dibutyl tin maleate polymer, and as an example of dialkyl tin polysulfide can be mentioned such as dibutyl tin polysulfide.

The organotin compounds to be used according to this invention are by no means limited to those enumerated hereinabove, but any can be used so long as it possesses in its molecules either the structure

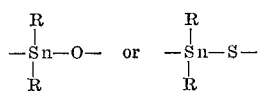

Further, although an organotin compound may be used in this invention, in most cases a mixture of two or more thereof is used.

These organotin compounds are generally derived from the organotin oxides. They are difficult to obtain as simple compounds, and are generally obtained in the form of mixtures. Mixtures of organotin compounds, which are commercially available as stabilizers for vinyl chloride resin use, can also be conveniently used.

For incorporating these organotin compounds in the plasticized polyvinylacetal compositions in this invention, this can be achieved by carrying out the homogeneous mixing of the polyvinylacetal resin, plasticizer and organotin compound, employing a suitable agitator such as a blender or kneader.

The amount of the organotin compound to be added to the plasticized polyvinylacetal composition is not particularly restricted, but when the amount added is insufficient, an improvement cannot be had in the resistance to penetration of the laminated glass, whereas when the amount is excessive, the adhering strength of the polyvinylacetal composition and the glass declines, which is not desirable. The resistance to penetration of the laminated glass can be enhanced greatly by the addition of the organotin compound in an amount ranging preferably between 0.01 and 1.0 part by weight, and particularly 0.05 and 0.5 part by weight, based on 100 parts by weight of polyvinyl acetal.

The mixture consisting of the polyvinylacetal, plasticizer and organotin compound is, in customary manner, kneaded and then formed into a film by means of an extruder or a calender roll. The film is made into a suitable thickness in accordance with the use to which it is to put. Laminated glass for automobile and aircraft use is usually 0.015-0.03 inch thick, but in some cases one which is at least 0.045 inch thick is used.

The film of plasticized polyvinylacetal composition containing an organotin compound according to this invention may contain minute amounts of moisture stabilizer, lubricant, dyestuff or pigment and basic substances. Especially in the case of moisture, if the amount contained in the film is less than 1.0% by weight, it is rather desirable for improving the resistance to penetration of the laminated glass.

According to this invention, the surfaces of the plasticized polyvinylacetal resin film formed in customary manner by means of an extruder or a calender roll may be coated by sodium bicarbonate powder for preventing the adhesion of the film to each other during storage. In this case, the film, before being adhered to the glass, is washed with water to remove the sodium bicarbonate covering the surfaces and thereafter, in drying the film by means of a suitable procedure, the moisture content of the film can be adjusted.

In making the laminated glass by sandwiching together glass and the so obtained film, the usual procedure in manufacturing laminated glass may be followed. Generally, a laminated glass can be obtained by sandwiching the plasticized polyvinylacetal composition film between two sheets of glass and holding them in this state for 10 minutes at a temperature of 85-170° C. and a pressure of 10-16 kg./cm.$^2$.

Although the reason why the resistance to penetration becomes especially good in the case of the invention laminated glass is not clear, it is considered according to our studies that because of the admixture of the organotin compound in the plasticized polyvinylacetal composition the adhesive force at the interrface of the resin composition and the glass declines somewhat to cause slippage to occur to a certain extent at the inerface of the film and glass when the laminated glass is subjected to an impact, with the consequence that the impact energy is absorbed by the stretch of the film at that time.

As a result of the fact that the invention laminated glass is that in which sheets of glass are adhered together by means of an organotin compound-containing plasticized polyvinylacetal composition, its resistance to penetration becomes extremely good.

Further, the organotin compounds not only can be mixed readily and homogeneously with the plasticized polyvinylacetal, but it does not impair the transparency of the film as well. Hence, the transparency of the invention laminated glass is not impaired.

Further, the shortcomings, as seen in the conventional laminated glass, i.e., such flaws as bubbles and discoloration, are not seen at all in the invention laminated glass. In addition, it also is superior in its resistance to ageing.

The laminated glass of this invention is effectively used as safety glass of windows of automobiles, aircraft, high speed vehicles and buildings.

The following nonlimitative examples and references are given for further illustrating this invention, wherein the parts therein are on a weight basis unless otherwise noted.

EXAMPLES 1-13

To 100 parts of polyvinylbutyral of a degree of polymerization of about 1700 and having about 65 mol percent of vinyl butyral, about 1 mol percent of vinyl acetate and about 34 mol percent of vinyl alcohol was added a mixed solution of 40 parts of triethylene glycol-di-2-ethylbutylate and an organotin compound of the class and in an amount indicated in the following Table I. After the mixture was homogeneously mixed, it was extruded using an extruder to yield a film 0.030 inch in thickness. This film was sandwiched between two sheets of glass 0.12 inch in thickness and heated to 100° C. at 12 kg./cm.$^2$ to obtain a laminated glass.

TABLE I

| Example | Organotin compound | Amount (part) |
| --- | --- | --- |
| 1 | Dibutyl tin dilaurate | 0.1 |
| 2 | Dibutyl tin maleate | 0.1 |
| 3 | Dioctyl tin monobutoxy-monodecyl maleate | 0.2 |
| 4 | Dibutyl tin dithiooctyl glycolate | 0.2 |
| 5 | Tribenzyl tin monodecyl maleate | 0.4 |
| 6 | Octoxy-dibutyl tin trimer-monooctyl maleate | 0.1 |
| 7 | Dibutyl tin sulfide tetramer | 0.2 |
| 8 | Polymerized dibutyl tin diethyleneglycol-dithioglycolate | 0.2 |
| 9 | {Dioctyl tin distearate | 0.05 |
|   | {Ethoxy-dibutyl tin tetramer-oleate | 0.05 |
| 10 | Dibutyl tin butoxylaurate | 0.3 |
| 11 | Dibutyl tin di-monodecyl maleate | 0.1 |
| 12 | Dibutyl tin trimer-dibutoxide | 0.2 |
| 13 | Dibutyl tin laurate-monooctyl maleate | 0.2 |

EXAMPLE 14

A mixed solution of 0.1 part of octoxy dibutyl tin trimermonooctyl maleate and 40 parts of triethylene glycol-di-2 ethyl butyrate was added to 100 parts of the polyvinylbutyral as used in Examples 1-13. After homogeneously mixing the mixture, it was extruded by means of an extruder to yield a film 0.030 inch in thickness. This film was washed with water, wiped of water drops and dried for 2 hours at 50° C. under a reduced pressure of 50 mm. Hg. The moisture content of the film was adjusted to about 0.5% by weight by allowing it to stand for 0.5 hour in 20° C. air of a RH 60%. The so obtained film was sandwiched between two sheets of 0.12-inch-thick glass and heated to 100° C. at 12 kg./cm.$^2$ to make a laminated glass.

EXAMPLE 15

Except that 0.2 part of polymerized dibutyl tin diethylene glycol-dioctyl glycolate was used instead of 0.1 part of octyloxy-dibutyl tin trimer-monooctyl maleate in Example 14, the operation was otherwise carried out as described therein to make a laminated glass.

EXAMPLE 16

A mixed solution of 0.1 part of dioctyl tin didecyl mercaptide, 0.1 part of dibutyl tin sulfide trimer and 40 parts of triethylene glycol-di-2 ethyl butyrate was added to 100 parts of the polyvinylbutyral resin as used in Examples 1-13. After homogeneously mixing the mixture, it was extruded from an extruder to yield a 0.30-inch-thick film. This film was washed with water, wiped of the water drops and dried for 2 hours at 50° C. under a reduced pressure of 50 mm. Hg. The moisture content of the film was adjusted to 0.7% by weight by allowing it to stand for one hour in 20° C. air of a RH 60%. A laminated glass was manufactured by sandwiching the so obtained film between two sheets of 0.12 inch-thick glass and heating the sandwiched glass to 100° C. at 12 kg./cm.$^2$.

Reference 1

100 parts of the polybinylbutyral as used in Examples 1-13 were mixed with 40 parts of triethylene glycol-di-2 ethyl butyrate and extruded from an extruder to yield a 0.030-inch-thick film. A laminated glass was made by sandwiching this film between two 0.12-inch-thick sheet glasses and heating the sandwiched glass at 100° C. at 12 kg./cm.²

Reference 2

A film as obtained in Reference 1 was washed with water, wiped of the water drops and dried for 2 hours at 50° C. under a reduced pressure of 50 mm. Hg., following which the moisture content of the film was adjusted to about 0.5% by weight by allowing it to stand for 0.5 hour in 20° C. air of a RH 60%. This film was sandwiched between two 0.12-inch-thick sheet glasses and heated to 100° C. at 12 kg./cm.² to make a laminated glass.

The several laminated glasses obtained in the foregonig examples and references were cut to a size 300 mm. x 300 mm. Supporting each of these glass specimens on an iron frame of square shape having an outside dimension of 310 mm. x 310 mm. and an inside dimension of 260 mm. x 260 mm., an iron ball weighing 4 kg. was dropped from a point directly above to obtain the relationship between the height from which the ball is dropped and the state of breakage that takes place in the glass. The results are shown in Table II.

It can be seen from these results that the laminated glass according to this invention (Examples 1–16) are far superior to the conventional laminated glass.

TABLE II

| | Height From which ball was dropped (m). | | | | | | |
|---|---|---|---|---|---|---|---|
| | 1.5 | 2.0 | 2.5 | 3.0 | 3.5 | 4.0 | 4.5 |
| Example: | | | | | | | |
| 1 | | | | O | O | △ | X |
| 2 | | | | O | O | △ | X |
| 3 | | | | O | O | X | |
| 4 | | | O | O | △ | X | |
| 5 | | | O | O | X | | |
| 6 | | | | O | O | △ | X |
| 7 | | | O | O | X | | |
| 8 | | | | O | △ | △ | X |
| 9 | | | | O | O | X | |
| 10 | | | O | O | △ | X | |
| 11 | | | | O | O | X | |
| 12 | | | | O | O | X | |
| 13 | | | | O | O | X | |
| 14 | | | | | O | O | X |
| 15 | | | | O | O | △ | X |
| 16 | | | | O | O | △ | X |
| Reference: | | | | | | | |
| 1 | O | X | | | | | |
| 2 | O | O | X | | | | |

NOTE: O=not pierced and not broken; △=not pierced but partly broken; X=pierced.

We claim:

1. In laminated safety-glass which comprises at least two sheets of glass adhered together with a plasticized polyvinylacetal interlayer, the improvement wherein said interlayer contains at least one organotin compound, said tin compound containing in its molecules a member selected from the group consisting of structural units of the formulas

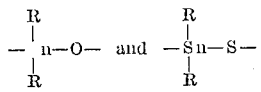

wherein R is a member selected from the group consisting of alkyl, aryl and aralkyl.

2. An improved safety-glass according to claim 1 wherein said polyvinylacetal is polyvinylbutyral.

3. An improved laminated safety-glass according to claim 2 wherein the said polyvinylbutyral has 55–75 mole percent of vinyl butyral and 0–15 mole percent of vinyl acetate, said polyvinylbutyral being plasticized with 20–80 parts by weight of a plasticiser per 100 parts by weight of the polyvinylbutyral.

4. An improved laminated safety-glass according to claim 1 wherein said organotin compound is present in an amount of 0.01–1.0 part by weight based on the polyvinyl acetal.

5. An improved laminated safety-glass according to claim 1 wherein the moisture content of said interlayer is 0–1.0 part by weight based on 100 parts by weight of polyvinyl acetal.

6. An improved laminated safety-glass according to claim 1 wherein said organotin compound is a compound selected from the group consisting of those having the formulas

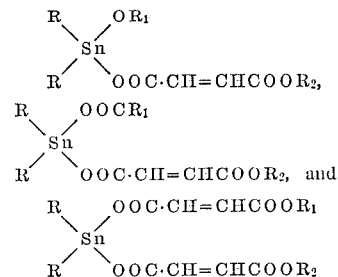

wherein R, $R_1$ and $R_2$ are an alkyl radical of 1 to 22 carbon atoms.

7. An improved laminated safety-glass according to claim 1 wherein said organotin compound is a compound selected from those having the formulas

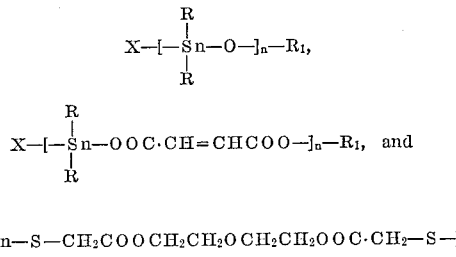

[—Sn—S—CH₂COOCH₂CH₂OCH₂CH₂OOC·CH₂—S—]ₙ
   |
   R wherein X— is a member selected from the group consisting of $R_2 \cdot COO—$ and $R_2O—$, R, $R_1$ and $R_2$ are an alkyl radical of 1 to 22 carbon atoms, and $n$ is a positive integer from 2 to 20.

8. An improved interlayer for laminated glass, said interlayer comprising plasticized polyvinylacetal, said polyvinylacetal containing at least one organotin compound having in its molecules a member selected from the structural units of the formulas

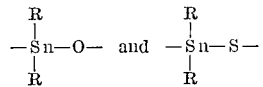

wherein R is a member selected from the group consisting of alkyl, aryl and aralkyl.

9. An improved interlayer according to claim 8 wherein said polyvinylacetal is polyvinylbutyral.

10. An improved interlayer according to claim 9 wherein the said polyvinylbutyral has 55–75 mole percent of vinyl butyral and 0–10 mole percent of vinyl acetate, said polyvinylbutyral being plasticized with 20–80 parts by weight of a plasticizer per 100 parts by weight of the polyvinylbutyral.

11. An improved interlayer according to claim 8 wherein said organotin compound is present in an amount of 0.01–1.0 part by weight based on the polyvinylacetal.

12. An improved interlayer according to claim 8 wherein the moisture content of said interlayer is 0–1.0% by weight.

13. An improved interlayer according to claim 8 wherein said organotin compound is a member selected from the group consisting of those having the formulas

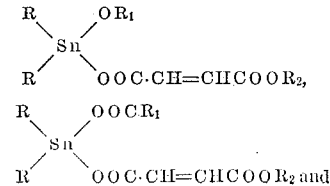

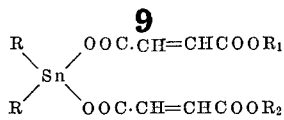

wherein R, $R_1$ and $R_2$ are an alkyl radical of 1 to 22 carbon atoms.

14. An improved interlayer according to claim 8 wherein said organotin compound is a member selected from those having the formulas

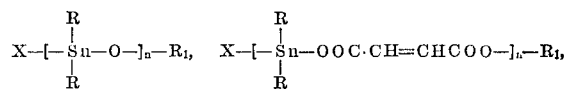

and

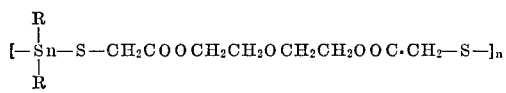

wherein X— is a member selected from the group consisting of $R_2COO$— and $R_2O$, R, $R_1$ and $R_2$ is an alkyl radical of 1 to 22 carbon atoms and $n$ is a positive integer of 2 to 20.

References Cited

UNITED STATES PATENTS

| | | | |
|---|---|---|---|
| 3,249,489 | 5/1966 | Lavin et al. | 161—199 |
| 3,262,837 | 7/1966 | Lavin et al. | 161—199 |
| 3,271,235 | 9/1966 | Lavin et al. | 161—199 |
| 3,396,074 | 8/1968 | Christensen | 161—199 |
| 3,402,099 | 9/1968 | Christensen | 161—199 |
| 3,434,915 | 3/1969 | Garrison | 161—199 |
| 3,437,553 | 4/1969 | Hailstone | 161—199 |

JOHN T. GOOLKASIAN, Primary Examiner

D. J. FRITSCH, Assistant Examiner

U.S. Cl. X.R.

156—106; 161—125; 260—45.7, 45.75, 45.85, 73